United States Patent [19]

Folter et al.

[11] Patent Number: 5,413,230

[45] Date of Patent: May 9, 1995

[54] REFILLABLE COMPRESSED GAS CAPSULE

[75] Inventors: Christian Folter; Franz Gröbl, both of Vienna, Austria

[73] Assignee: ISI Metallwarenfabrik Ges. m.b.H., Vienna, Austria

[21] Appl. No.: 94,479

[22] Filed: Jul. 19, 1993

[51] Int. Cl.[6] .................................. B65D 23/00
[52] U.S. Cl. ........................ 215/5; 215/260;
   215/270; 215/274; 215/308; 215/315; 220/231;
   220/281; 220/581; 220/86.1; 220/89.1;
   141/348; 141/351; 137/544; 251/149.6;
   251/339
[58] Field of Search ............... 220/203, 208, 209, 212,
   220/231, 281, 360, 361, 366, 371, 373, 581, 86.1,
   89.1; 215/3-5, 16, 260, 270, 271, 274, 279, 307,
   308, 311, 315, 228; 141/346, 348, 349, 351, 353,
   354, 357, 360, 362; 137/544; 251/149.6, 339

[56] References Cited

U.S. PATENT DOCUMENTS

| 1,844,099 | 2/1932 | Meier | 137/544 X |
|---|---|---|---|
| 2,819,799 | 1/1958 | Wilkerson | 251/399 X |
| 3,186,449 | 6/1965 | Tissot-Dupont | 141/353 X |
| 3,318,346 | 5/1967 | Maltner | 141/349 X |
| 3,329,180 | 7/1967 | Brocklin | 141/349 |
| 3,646,955 | 3/1972 | Olde | 251/339 X |
| 4,067,358 | 1/1978 | Streich | 137/515 X |
| 4,365,648 | 12/1982 | Grothe | 137/544 X |
| 4,961,449 | 10/1990 | Demeautis et al. | 141/346 X |
| 4,971,224 | 11/1990 | Scremin | 251/339 X |
| 4,991,635 | 2/1991 | Ulm | 141/346 |

FOREIGN PATENT DOCUMENTS 1368185  11/1964  France.

Primary Examiner—Allan N. Shoap
Assistant Examiner—Stephen Cronin
Attorney, Agent, or Firm—Collard & Roe

[57] ABSTRACT

A refillable compressed gas capsule, in particular, for household uses and for compressed-gas hand-operated devices, includes a valve body pretensioned by a spring and slidably held against a valve seat by the inner pressure of the compressed-gas capsule and against the pretension towards the interior of the capsule, which body is held in a holding means inserted into an opening provided in the face side of the capsule limiting the opening path of said valve body and comprising at least one opening leading into the interior of the capsule. In order to produce such a compressed-gas capsule in a very simple manner, it is provided that the holding means and the valve seat are held at least indirectly by an inwardly directed flanged edge of the capsule.

8 Claims, 3 Drawing Sheets

REFILLABLE COMPRESSED GAS CAPSULE

BACKGROUND OF THE INVENTION

1. Field of the Invention

The present invention relates to a refillable compressed gas container or capsule, in particular for household uses, such as a syphon or for compressed-gas hand-operated devices and the like, comprising a valve body pre-tensioned by a spring and slidably held against a valve seat by the inner pressure of the compressed gas within the capsule and against the pre-tension spring towards the interior of the capsule. The valve body is held in holding means inserted into an opening provided in the face side of the capsule, limiting the opening path of said valve body and comprising at least one opening which leads into the interior of the capsule.

2. The Prior Art

French Patent No, 1,368,185 discloses a compressed gas bottle with a valve which can be screwed into its opening, in which the valve body formed by a ball is held in holding means formed by two parts screwed together, which holding means is screwed into a threaded bore of the compressed gas bottle. In this embodiment, one of two parts of the holding means is provided with an intermediate wall having a bore on which a valve seat is supported. This valve seat is made from plastic and rests on the intermediate wall of the one part of the holding means.

The disadvantage of this prior art bottle is caused by considerable production expenses, due to the large number of threads required. Moreover, there are safety-related problems in this known bottle in the event of fires. In such a case, the pressure in the interior of the compressed gas bottle rises to a dangerous level due to the relatively high temperature, even if the valve seat made from plastic is destroyed. Once this occurs, the ball used as a valve body is pressed against the edge of the bore of the intermediate wall and occludes it. Even if the ball does not fully seal the opening of the bore, the gas can only escape very slowly, so that despite even small leaks, a dangerous rise in the pressure may occur.

SUMMARY OF THE INVENTION

It is an object of the present invention to avoid such disadvantages, and to provide a refillable compressed gas container capsule which can be produced easily and quickly.

In accordance with the invention, this object is achieved by having the holding means and the valve seat held at least indirectly by an inwardly directed flanged edge of the capsule.

These measures ensure that the valve formed by the valve seat and the valve body can be built into the capsule very easily, whereby this arrangement of structural elements is also possible in small capsules such as those used for household syphons, weapons operated with compressed gas or hand-operated devices such as staplers or the like, driven with compressed gas. Furthermore, by avoiding threads it is possible to prevent the formation of notch cracks, which can easily occur within the threads, in particular in threads of small diameters.

A further advantage of the capsule in accordance with the invention is that there are substantially smooth surfaces, thus considerably reducing the deposition of dirt particles. In this connection it may further be provided that the opening leading into the interior of the container capsule may be covered by a filter. In this manner it is possible to safely prevent the penetration of dirt particles during the refilling of the capsule in accordance with the invention.

In accordance with a further feature of the invention, the valve seat is integrated into a seal which is held by a holding element comprising two pipe-like sections connected with one another via a ring shoulder. The ring shoulder may be overlapped by the inwardly directed flanged edge, possibly by interposing a further seal.

In this manner a secure connecting of the holding body is accomplished and thus a secure connecting of the seal and the valve face is also achieved. Furthermore, the ring space encompassing the holding element which can be maintained a limited distance in from the inner wall of the compressed gas capsule can be sealed very easily by interposing an additional seal.

In this respect, it may be further provided that the holding means is arranged as a pot-shaped part whose open end comprises an outwardly directed flange which rests on a ring shoulder of a bore of the capsule and on which the holding element and the seal including the valve seat rests.

In this manner a valve arrangement is achieved which is easy to install and is very simple to use. Moreover, it can be anchored very easily in the compressed gas capsule. For this purpose it is sufficient to place the filter, the spring and the valve body in the holding means and to insert it into the compressed gas capsule. After this insertion, the upper edge of the compressed gas capsule can be flanged inwardly after the placement of the holding element including the seals.

In accordance with a further feature of the invention, the valve body comprises two cylindrical sections which are connected by an intermediate conical section, of which the section with the larger diameter is guided in the holding means with little clearance and the valve seat cooperates with the conical intermediate section of the valve body.

In this manner it is possible to machine the conical intermediate section more finely, because only it cooperates with the valve face. Moreover, due to the small ring clearance space or gap between the valve body and the holding means there is a throttling effect which limits the gas quantity flowing in per time unit during the filling of the compressed gas capsule.

This allows conducting the filling of the compressed gas capsule in a time controlled manner and measuring the quantity filled in by weighing the capsule before and after the filling. Simultaneously, this also allows checking the capsule for any entrained dirt particles because these reduce the permeability of the filter and block the ring clearance space between the valve body and the holding means, thus increasing the flow resistance accordingly for the gas flowing in. This increased resistance leads to a lower degree of filling as compared with clean capsules, so that these capsules can be identified very easily and removed from the process.

A soiling of compressed gas capsules cannot always be prevented, in particular concerning the use of the capsules in damaged processors operated with compressed gas for the production of creamy pastry products such as whipped cream and the like.

In a further embodiment one of the tube-like sections of the holding element has an inner diameter which is smaller than the biggest diameter of the valve body.

This ensures that the valve body is also securely held in the compressed gas capsule even if the valve seat could ever become destroyed.

In a further embodiment, the valve body has a guiding section which projects with clearance into the tube-like section of the holding element comprising the smaller inner diameter. This ensures a very secure guidance of the valve body.

In a preferred embodiment of the invention, at least the seal comprising the valve seat is made from a material which is provided with only little resistance to heat, e.g., a low melting plastic, such as a thermoplastic like polyethylene.

By this measure, it is achieved that in the event of excessive heat, which is the case, for example, during a fire, the seal carrying the valve seat is destroyed and thus also the sealing of the interior of the compressed gas capsule with respect to the environment. In this way, the compressed gas can easily escape, whereby the valve body is not propelled outwardly by the escaping gas due to the fact that the inner diameter of the one tube-like section of the holding element is smaller than the largest diameter of the valve body.

In accordance with a further embodiment of the invention, the holding element has a tube-like section which projects above the flanged edge of the capsule.

In this manner, it is possible to distinguish them unmistakably from those in which the one tube-like section of the holding element does not project, because such capsules only fit into a certain receiver part due to the projecting section, or they can only be opened in such. In this way it is also very easily possible, by determining different lengths of the projecting section of the holding element, to allocate capsules filled with different gases or with different pressures to specific receiver parts, thus securely eliminating any confusion.

Furthermore, the projecting section for the holding part is also suitable for a secure sealing with respect to a receiver part for capsules filled to higher pressures, e.g., 100 bar. In this manner, the projecting section can be inserted into an O-ring held in the respective receiver part, thus leading to a better sealing than with a purely face-sided sealing, as has to occur in common capsules.

BRIEF DESCRIPTION OF THE DRAWINGS

Other objects and features of the present invention will become apparent from the following detailed description considered in connection with the accompanying drawings which discloses embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
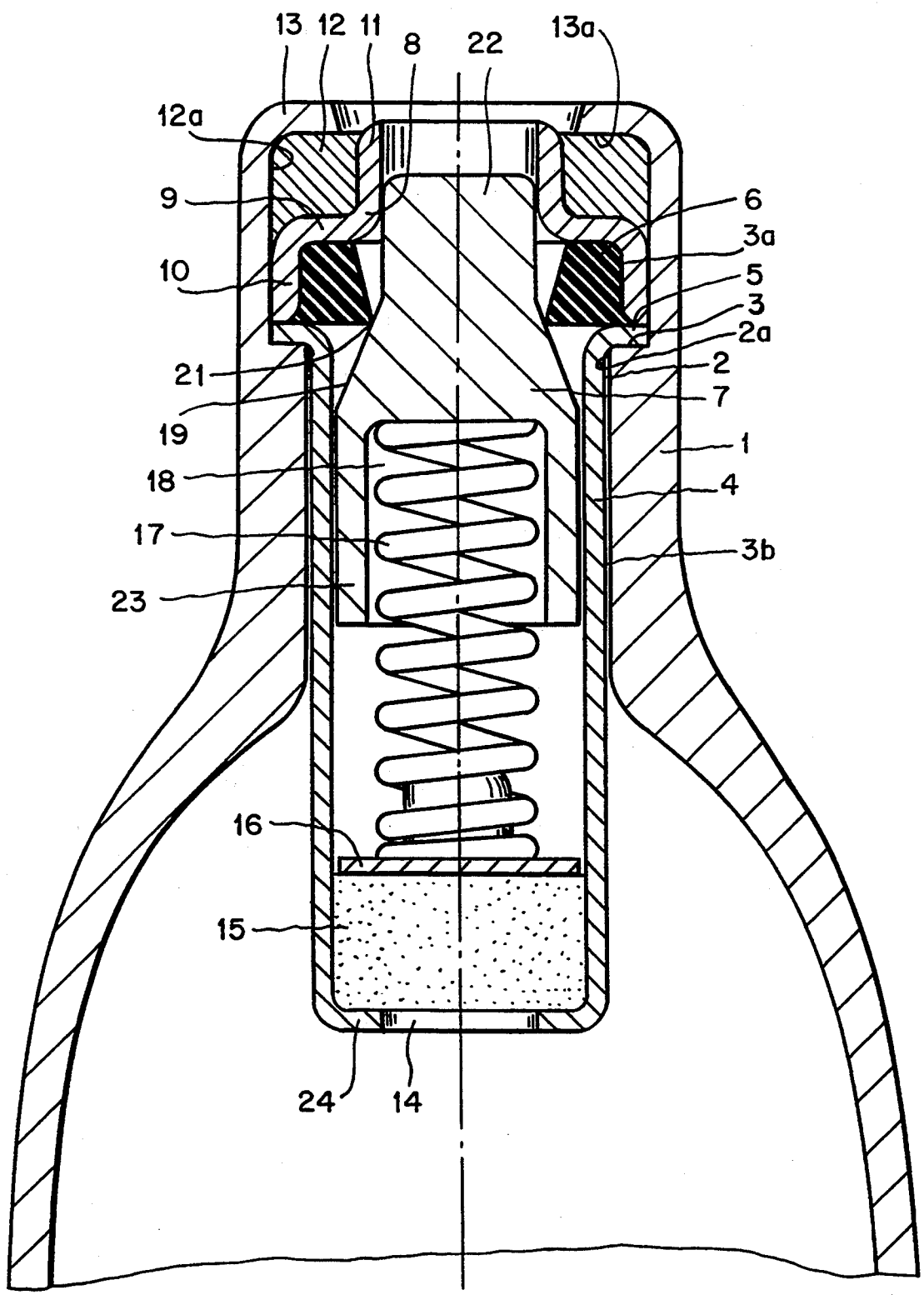
FIG. 1 shows a section view through a capsule in accordance with the invention with the valve in the closed position.

Turning now in detail to the drawings, FIG. 1 shows capsule or container 1 provided with a bore 2 on the inside face side 2a which is provided with a ring shoulder 3 on which is rested a hollow cylinder or pot-shaped holding means 4 with a flange 5. A seal 6 rests on flange 5. Ring shoulder 3 divides the bore 2 into an upper zone 3a of larger internal diameter and a lower zone 3b of smaller internal diameter. Seal 6 has a valve seat 21 for pressing against a valve body 7, which is in its closed position in FIG. 1.

The seal 6 is further held in place by a holding element 8 which comprises two cylindrical tube-like sections 10 and 11 connected with one another by means of a ring shoulder 9. Holding element 8 has a tight fit when inserted into upper zone 3a with only very little clearance when it encompasses guiding section 22 of valve body 7 in its closed position. Section 10 of holding element 8 is inserted into upper zone 3a of bore 2 of capsule 1 having the larger internal diameter.

Holding element 8 is held in place by a further seal 12 which is lodged close to the inner wall 12a in upper zone 3a of bore 2 and which rests on the ring shoulder 9 of holding element 8. Seal 12 is also positioned beneath inner side 13a of an inwardly directed flange 13 of capsule 1.

Valve body 7 has an upper cylindrical section 22 of smaller diameter and has a lower cylindrical section 23 of larger diameter with an intermediate conical section 19 connecting the lower to the upper section.

Holding means 4 is provided in its floor 24 with an inlet opening 14. Opening 14 is covered by a filter 15, and filter 15 is covered by intermediate plate 16 having a diameter smaller than the inner diameter of the holding means 4. The spring 17 rests on said plate 16 and is housed in a face-sided bore 18 of the lower section 23 of the valve body 7 and pretensions the valve body against valve seat 21. Furthermore, the lower cylindrical section 23 of the valve body 7 is guided in holding means 4 with little clearance.

Valve body 7 rests with its conical intermediate section 19 on seal 6 or on valve seat 21. Seal 6, in which valve seat 21 is built, is made of a material of low resistance to heat such as a low melting point thermoplastic like polyethylene. Seal 6 loses its deformation resistance at excessively high temperatures, thus causing a respective increase in pressure in the interior of the compressed gas capsule. At higher temperatures above the low melting point, the seal 6 readily becomes deformed, as is the case in fires, for example, and creates leakage zones that ensure that the gas can escape safely due to the resulting leak. It is further ensured that because flange 13 overlaps ring shoulder 9 of the holding element and overlaps the valve body 7 since section 23 has a diameter exceeding the clearance diameter of section 11 of holding element 8, valve body 7 cannot be propelled out of the gas container. This also ensures the highest possible safety even in the event of improper handling of container capsule 1.

Figure 2:
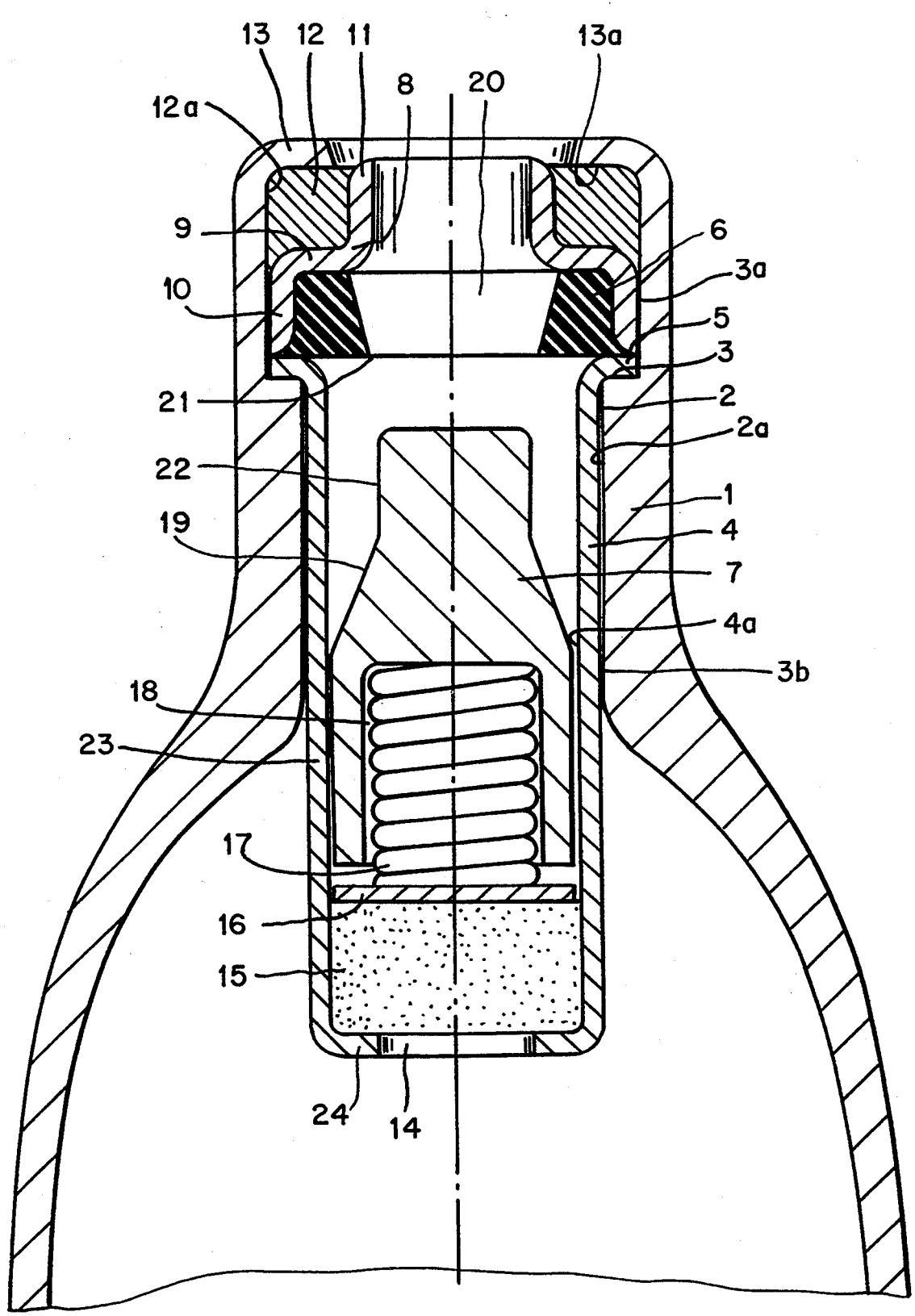
FIG. 2 shows a section view of the capsule in accordance with FIG. 1 with the valve in the opened position.

If, as can be seen in FIG. 2, the valve body 7 is moved inwardly toward the interior of the container or capsule by compressing spring 17 and, optionally, also against the force due to the interior gas pressure of capsule 1 in holding means 4, the compressed gas can escape through the inlet opening 14. The escaping gas flows through the clearance space or gap between the inner wall 4a of holding means 4 and the cylindrical surface of lower section 23 of valve body 7 and the opening 20 of seal 6. Conversely, the gas can flow into the interior of the capsule in the opposite direction during the filling thereof, with the compressed gas being forced to flow through filter 15 which may be formed by a filter paper, for example. In this way, any entrained dirt particles are prevented from reaching the interior of the container capsule.

Figure 3:
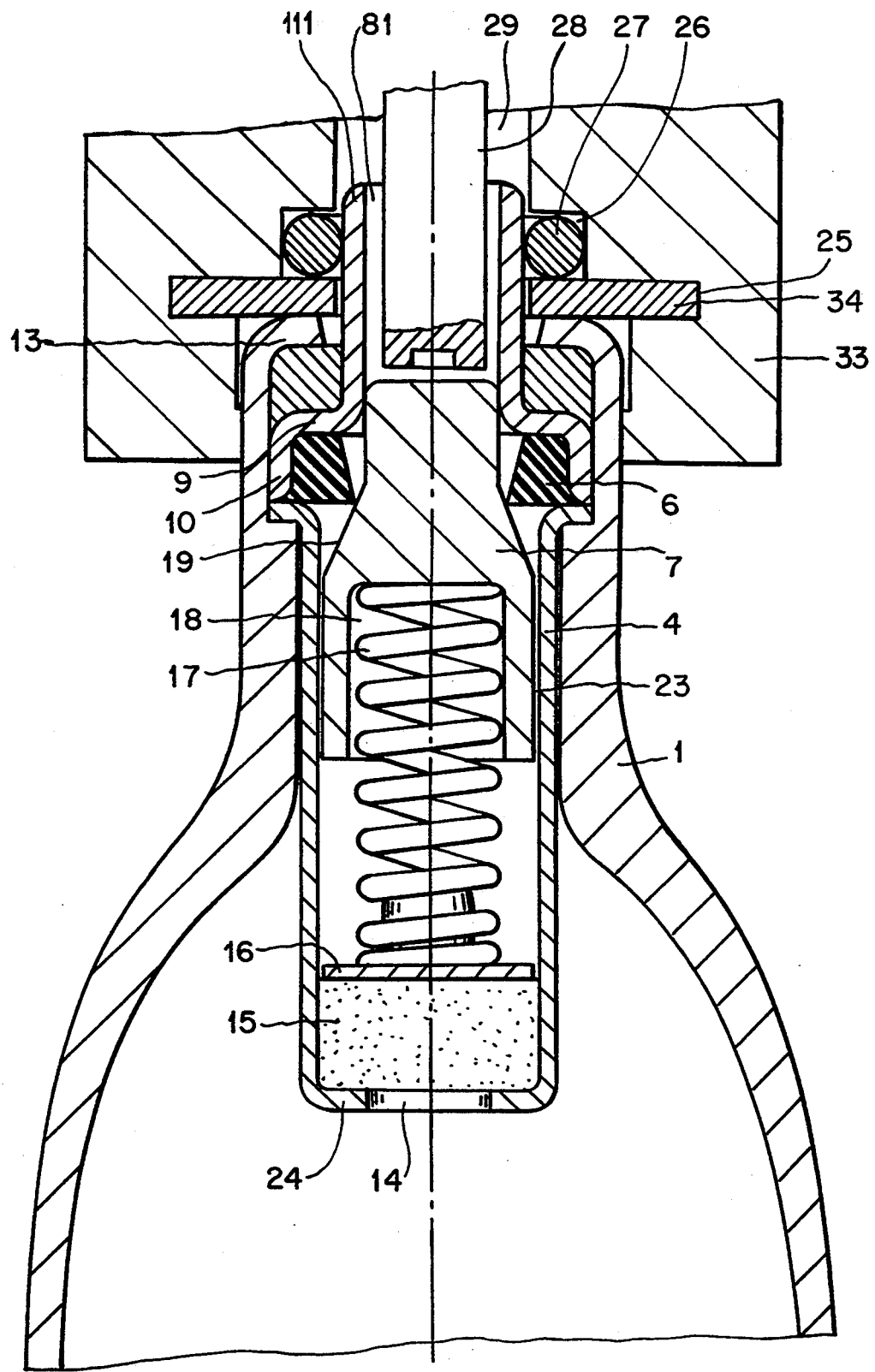
FIG. 3 shows a section view through a further embodiment of a capsule in accordance with the invention.

FIG. 3 shows a further embodiment of a compressed gas container capsule in accordance with the invention. This embodiment is distinguished from the embodiment shown in FIGS. 1 and 2 in that the holding element 81 has a tube-like section 111 which projects outwardly above and beyond the flanged edge 13 of capsule 1.

On the one hand, this projecting tube-like section 111 permits a clear distinction between capsules to be filled differently and, on the other hand, permits an improved sealing during the filling of the capsule in a receiver part 33.

Receiver part 33 has a pressure plate 34 held in a groove 25, which plate is provided with a central bore 29 for receiving the projecting part and tube-like section 111 of holding element 81. Pressure plate 34 supports an O-ring 27 placed into a recess 26 of receiver plate 33, which O-ring rests on the outer side of the projecting part and tube-like section 111 when the container capsule is inserted and which seals it against the receiver plate 33. In the receiver part 33 a tappet 28 is displaceably held which presses the valve body 7 of container capsule 1 into its "open" position during the filling of the capsule.

If further securing and distinguishing features are required for capsules containing different gases or for those with different pressures, slots of different widths could be provided. Also, combinations of slots with, for example, two slots in different angular positions could be provided in the face side of tube-like section 111 so as to distinguish between those capsules 1 that are to be filled differently, which slots cooperate with respective projections of receiver part 33 or tappet 28 projecting radially into the bores 29. In this way, it can be ensured in a very simple manner that only specific container capsules 1 could be fully inserted into each receiver part 33, so that only those that fit can be filled.

While several embodiments of the present invention have been shown and described, it is to be understood that many changes and modifications may be made thereunto without departing from the spirit and scope of the invention as defined in the appended claims.

What is claimed is:

1. Refillable compressed-gas capsule having spaced opposite face sides and an inwardly bent neck portion therein, said capsule comprising:
   a valve seat;
   a holding means within said capsule;
   a holding element;
   said inwardly bent neck portion indirectly holding the holding means and the valve seat forming an inwardly flanged edge via the holding element;
   a spring;
   a valve body pretensioned by the spring and slidably guided within said holding means, said valve body being held against the valve seat by the pressure of compressed-gas held within the capsule and the force of the spring, the valve body having an opening path;
   an opening provided in one of the face sides of the capsule;
   said holding means having at least one opening into the interior of the capsule, said holding means limiting said opening path of said valve body;
   said holding means being inserted in said opening in one of the face sides of said capsule, and said valve body being held in said holding means;
   said holding element having an axial passage way for the gas and at least two portions of different outer diameter;
   a ring shoulder connecting the two parts of different outer diameters of said holding element and being overlapped by said inwardly bent neck portion of the capsule;
   a seal held by the ring shoulder; and
   said valve body having two portions of different outer diameter, the portion of said valve body having the greater outer diameter being adjacent an interior of said capsule, said greater outer diameter being greater than the portion of said holding element having the smaller inner diameter to prevent said valve body from escaping from said capsule in case of damage of the valve seat.

2. Compressed-gas capsule as claimed in claim 1, further comprising a filter covering the opening of said holding means towards the interior of the capsule.

3. Compressed-gas capsule as claimed in claim 1, wherein said seal is integral with said valve seat and is held by said holding element and said ring shoulder;
   said holding element further having two tube-like sections connected to each other through said ring shoulder.

4. Compressed-gas capsule as claimed in claim 3, further comprising a bore formed in said capsule, said bore having two sections of different diameter forming a ring shoulder therebetween, and wherein said holding means has an open end comprising an outwardly directed flange which is supported on said ring shoulder formed by said bore of said capsule, and
   wherein said holding element and said seal comprising the valve seat rest on said flange.

5. Refillable compressed-gas capsule having spaced opposite face sides and an inwardly bent neck portion therein, said capsule comprising:
   a valve seat;
   a holding means within said capsule;
   a holding element;
   said inwardly bent neck portion indirectly holding the holding means and the valve seat forming an inwardly flanged edge via the holding element;
   a spring;
   a valve body pretensioned by the spring and slidably guided within said holding means, said valve body being held against the valve seat by the pressure of compressed-gas held within the capsule and the force of the spring, the valve body having an opening path;
   an opening provided in one of the face sides of the capsule;
   said holding means having at least one opening into the interior of the capsule, said holding means limiting said opening path of said valve body;
   said holding means being inserted in said opening in one of the face sides of said capsule, and said valve body being held in said holding means;
   said holding element having an axial passage way for the gas and at least two portions of different outer diameter;
   a ring shoulder connecting the two parts of different outer diameters of said holding element and being overlapped by said inwardly bent neck portion of the capsule;

a seal held by the ring shoulder; and wherein said seal is integral with said valve seat and is held by said holding element and said ring shoulder;

said valve body having two portions of different outer diameter, the portion of said valve body having the greater outer diameter being adjacent an interior of said capsule, said greater outer diameter being greater than the portion of said holding element having the smaller inner diameter to prevent said valve body from escaping from said capsule in case of damage of the valve seat;

said holding element further having two tube-like sections connected to each other through said ring shoulder;

a bore formed in said capsule, said bore having two sections of different diameter forming a ring shoulder therebetween, and wherein said holding means has an open end comprising an outwardly directed flange which is supported on said ring shoulder formed by said bore of said capsule, and wherein said holding element and said seal comprising the valve seat rest on said flange;

wherein said valve body has two cylindrical sections of different diameters and a conical section connecting the cylindrical sections, the cylindrical section with the larger diameter being guided in said holding means with less clearance; and wherein said valve seat cooperates with the conical section of the valve body.

6. Compressed-gas capsule as claimed in claim 5, wherein said valve body has a guiding section which projects with guidance into a tube-like section of the holding element having a smaller inner diameter than the other tube-like section; said guiding section having a smaller diameter than said section guided in said holding means.

7. Compressed-gas capsule as claimed in claim 6, wherein at least the seal having the valve seat is made from a material with low resistance to heat.

8. Compressed-gas capsule as claimed in claim 6, wherein said holding element projects via one of its tube-like sections beyond the bent neck portion of the capsule.

* * * * *